Figure 2:
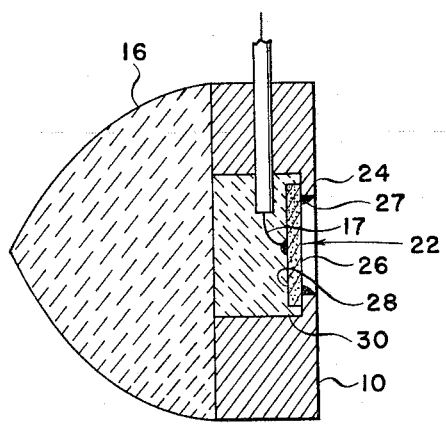

Dec. 13, 1966   A. E. BROWN ET AL   3,290,934
ACOUSTIC FLUID METERING DEVICE

Filed Sept. 27, 1962   4 Sheets-Sheet 1

INVENTORS.
ALVIN E. BROWN
FRED J. SUELLENTROP
ERIC RULE
DONALD J. HODGSON

BY George C. Sullivan
Agent

Dec. 13, 1966    A. E. BROWN ET AL    3,290,934
ACOUSTIC FLUID METERING DEVICE

Filed Sept. 27, 1962    4 Sheets-Sheet 3

INVENTORS.
ALVIN E. BROWN
FRED J. SUELLENTROP
ERIC RULE
DONALD J. HODGSON
BY
George Sullivan
Agent United States Patent Office 3,290,934
Patented Dec. 13, 1966

3,290,934
ACOUSTIC FLUID METERING DEVICE
Alvin E. Brown, Cupertino, Fred J. Suellentrop, Sunnyvale, Eric Rule, Palo Alto, and Donald J. Hodgson, Sunnyvale, Calif., assignors to Lockheed Aircraft Corporation, Burbank, Calif.
Filed Sept. 27, 1962, Ser. No. 226,512
3 Claims. (Cl. 73—194)

The present invention relates to an electronic device for measuring fluid flow and velocity of sound of a fluid and more particularly to a device for measuring the fluid flow independent of the velocity of the sound by employing a pair of ring-around velocity of sound meters.

Devices performing the measurement of the velocity of sound by the ring-around principle of the type disclosed in U.S. Patent No. 3,184,959, entitled "Velocity of Sound Meter" of which reference is herein made, consist of a transmitter and receiver spaced a predetermined distance L apart and a pulse generating source. The velocity measuring device is disposed in a liquid and the electrical pulse generated by the pulse source causes the transmitter to induce an energy pulse into the ambient liquid. This energy pulse is propagated through and traverses the distance L over a finite period of time $t$ where it is received and converted into an electrical pulse by the receiver. The receiver output pulse instantaneously actuates the pulse generating source which causes it to generate another pulse which is applied to the transmitter and the sequence is then repeated. Since the time $t$ required for the energy pulse to traverse the distance L is directly proportional to the acoustic velocity C of the ambient liquid, the time $t$ may be expressed as: $t=L/C$, and since the pulse frequency $f$ may be expressed as: $f=1/t=C/L$ the acoustic velocity of the ambient liquid is determined from the relationship: $C=Lf$.

Mechanical impeller-type instruments most commonly used to measure fluid current speeds are generally unsatisfactory because of bearing friction problems and because of inherent high inertia that leads to slow response to changing rates of flow. Acoustic flowmeters which effectively measure the results of the velocity of propagation of sound in a fluid with respect to the transmitting and receiving transducer have been described in the art. These instruments are subject to error when used in a fluid in which the velocity of propagation can vary. In the case of a sing-path instrument, the error in flow velocity measurement is equal to the deviation in the velocity of sound from the value pertaining when the instrument was calibrated. Refinement of the instrument to a two-path type reduces this error to the extent that a given percentage variation in the velocity of sound from calibration conditions will result in the same percentage of error in the flow measurement. The possible variation in the velocity of sound over the complete range of oceanographic conditions is about 12 percent so that an unacceptable error in flowmeter readings can be introduced in this way. A further objection to the type of acoustic flowmeter usually described is that the technique involves a measurement of phase difference, and the requirement of providing sufficient sensitivity, on the one hand, and the need to avoid ambiguity, on the other, becomes contradictory in a wide-range instrument.

The object of the present invention is to provide a basically simple flowmeter and velocimeter which avoids the difficulties of the above-described acoustic-type instruments.

Another object of the present invention is in the use of a novel electronics circuit whereby the velocity of sound and the flow may be derived independently of each other.

Another object of the present invention is to provide an improved acoustic fluid metering device providing accurate measure of flow when the flow velocity is very low.

One feature of the present invention is in the use of a novel electronic circuit whereby the velocity of sound and the velocity of flow may be accurately derived independently of each other even when the flow velocity is very low.

Figure 6:
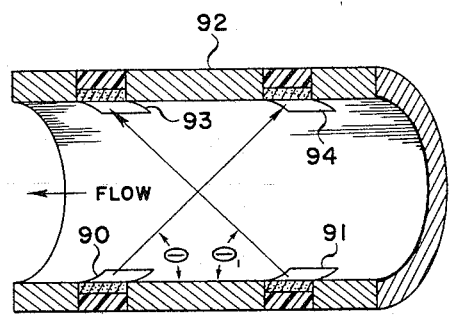
Figure 1:
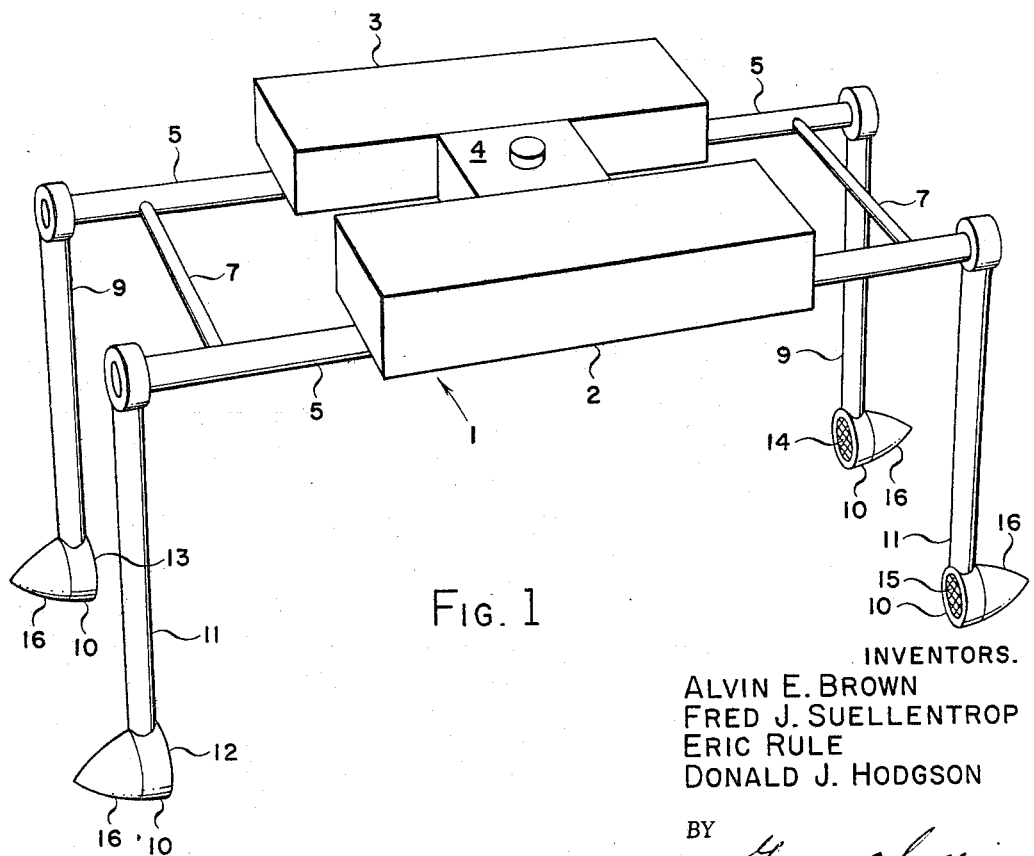
Figure 3:
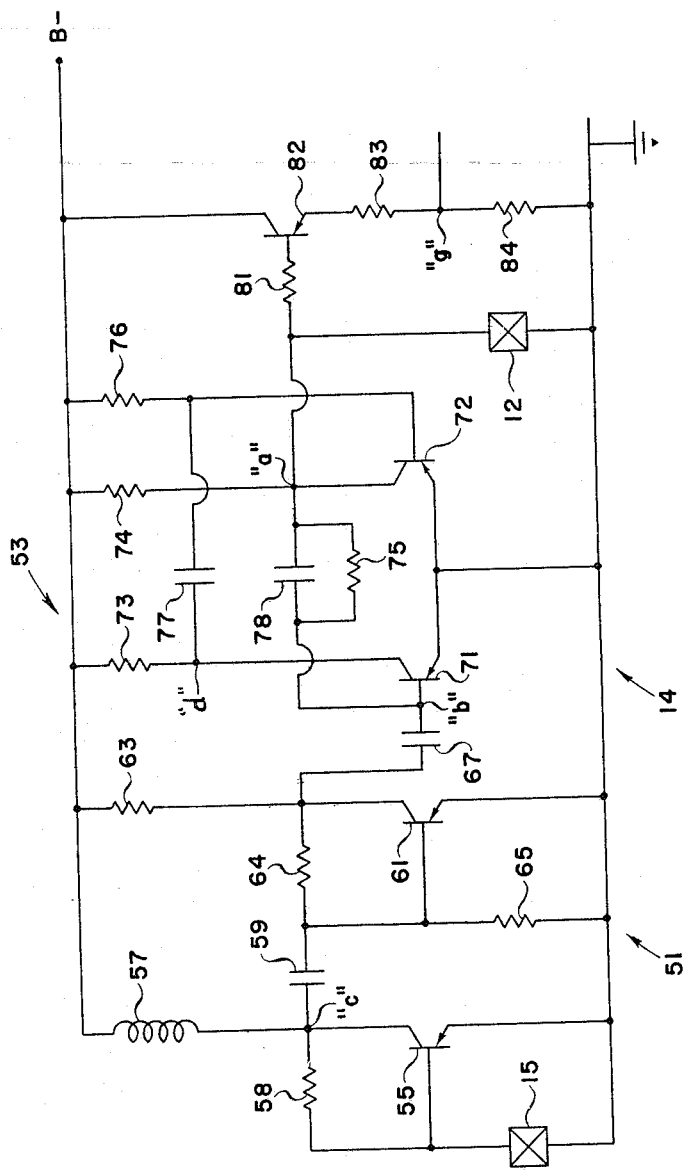
Figure 4:
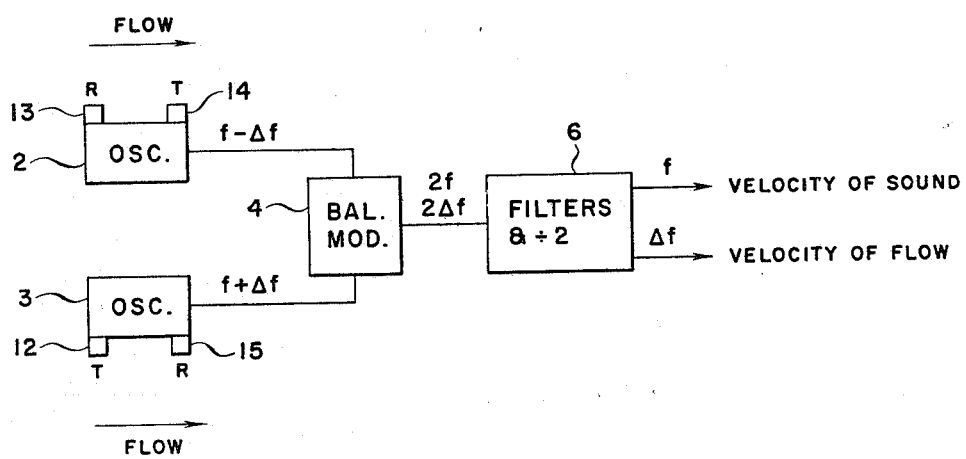
Figure 5:
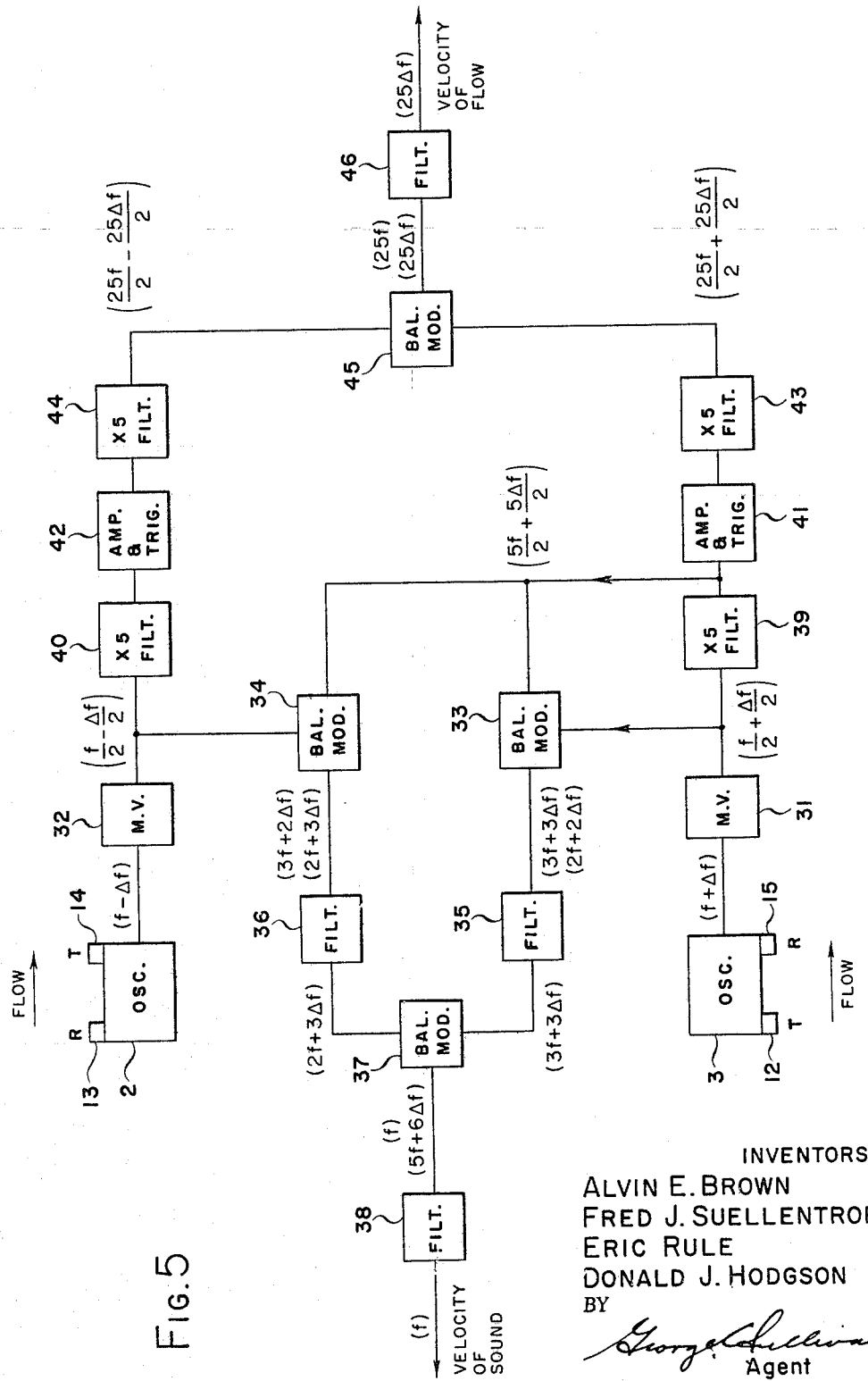

These and other features and objects of the present invention will become apparent upon perusal of the following specifications and drawings in which:

FIGURE 1 is a perspective view illustrating the constructional configuration of the flowmeter and velocity of sound measuring device of the present invention, FIGURE 2 is a sectional view partly broken away of the transducers of FIGURE 1, FIGURE 3 is a schematic illustration of the pulse generating circuit of the present invention, FIGURE 4 is a block diagram of the basic electronic circuit of the present invention, FIGURE 5 is a block diagram of the balanced modulator of the present invention, and FIGURE 6 is an alternative arrangement of transducers of the present invention.

In FIGURE 1 is shown the sing-around flowmeter and velocity of sound meter device of the present invention as generally denoted by reference numeral 1. Device 1 consists generally of a pair of velocity of sound meters 2 and 3 interconnected by an electronic circuit 4 comprising a balanced modulator, a plurality of multiplier circuits and high and low pass filters, which will be described in detail presently. Velocity of sound meters 2 and 3 are securely mounted on a pair of hollow metal rods 5, supported in a substantially parallel relationship by metal brace members 7. A pair of extended leg pairs 9 and 11, securely supported from the ends of support rods 5 as by welding or press fit, extend from metal rods 5 on the opposite side thereof from the velocity of sound meters 2 and 3. Positioned at the lower extremities of leg pairs 9 and 11 are transmitting transducer discs 12 and 14 and receiving transducer discs 13 and 15 mounted in the center openings of metal blocks 10. Block 10 may be hydrodynamically shaped to aid in maintaining the transducers in proper relation to the flow of fluid passing along cone 16, constructed of a material strong enough to withstand pressures at great depths, as of, for example, epoxy resin or plastic wood may be attached to block 10 by any desired means.

The construction of the transmitting sections 12 and 14 is substantially identical to construction of the receiving sections 13 and 15. A detailed cross-section view of section 13 is shown in FIGURE 2 wherein a center opening of block 10 has a small annularly inwardly extending collar 24.

Interior surface 26 of disc 22 is attached to collar 24 by means of solder 27 or similar material, which is deposited about the entire peripheral surface. In this manner the interior surface of disc 22 is electrically connected to collar 24 of block 10 and a relatively large surface area is exposed to fluid. It is necessary that the interior surface 26 and the exterior surface 28 of disc 22 be electrically insulated and the annular solder ring 27 also functions to prevent liquid from entering this base between surface 26 and collar 24. Fluid is prevented from contacting surface 28 by filling the openings adjacent surface 28 with epoxy resin 30. The epoxy resin 30 is selected so that the acoustic impedance matching between the disc and the resin is very poor and therefore little energy is transmitted to the resin when the disc resonates. Lead-wire 17 is connected to the surface 28 and passes through a small opening in the block 10 to the hereinafter described pulse generating section of the velocity of sound meter 2 and 3.

In FIGURE 3 is schematically illustrated transmitting disc 12, receiving disc 15, and the pulse generating circuit of velocity of sound meters 2 and 3. Discs 12 and 15 may be made, for example, of barium titanate having a predetermined resonant frequency which is primarily dependent upon the physical dimensions of the discs. Each of these discs is matched and has a resonant frequency of about 3 megacycles. It is to be understood that discs may be selected having a substantial departure from this frequency and corresponding variations of circuit parameters may be employed and remain within the scope of the present invention.

When disc 12 is caused to resonate, an energy pulse is induced into the ambient fluid and is received by disc 15 after some finite time interval ($t_1$). The energy pulse received by disc 15 is converted into an electrical signal and applied to the input of amplifier circuit 51 which triggers multivibrator circuit 53. The sequence is then repeated. The time lag between the receipt of the energy pulse by disc 15 and the resultant output signal of multivibrator 53 is negligible. The philosophy of operation of this circuit is fully explained in the aforementioned U.S. Patent No. 3,184,959.

Amplifier circuit 51 includes transistor 55 which has the collector thereof connected through choke coil 57 to the B— power supply. Resistor 58 is provided to set the operating point of transistor 55 and choke coil 57 functions both as a high pass filter and a collector load. As a high pass filter, coil 57 shunts low frequency signals appearing at point "c" to the B— power supply and in this manner prevents unwanted low frequency signals from being transmitted through coupling capacitor 59. Low frequency signals may be derived from pressure waves striking disc 15, and if these signals were not shunted by choke coil 57, they would trigger transistor 61 and multivibrator circuit 53 which would cause disc 12 to resonate at an improper time. Resistor 63 provides a collector load and resistors 64 and 65 set the operating point for transistor 61 and the output signal from transistor 61 is connected through coupling capacitor 67 to point "b."

Multivibrator circuit 53 includes transistors 71 and 72 and collector loads therefor are respectively provided by resistors 73 and 74. The base of transistor 71 is connected through resistors 74 and 75 to B— wherein the series resistance of these resistors is relatively low to provide an overbias of transistor 71. Since transistor 71 is overbiased, the multivibrator will free run without receiving pulses from disc 15 at a frequency less than the operating frequency when the system is immersed in a liquid.

When the base of transistor 71 is driven positive, it will become nonconducting and the voltage at point "d" is rapidly driven negative. This negative-going signal is coupled to the base of transistor 72 through capacitor 77 and therefore drives transistor 72 to conduction. When transistor 72 is conducting, point "a," which is coupled through resistor 75 and capacitor 78 to the base of transistor 71, is driven positive and consequently causes transistor 71 to assume a highly nonconducting state. Transistor 71 will again become conducting at a time determined by the time constant of capacitor 78 and resistor 74. The sequence is then repeated when the base of transistor 71 is again driven positive.

The output (point "a") of multivibrator circuit 53 is applied directly to disc 12. Barium titanate discs have high capacitance; consequently, a low impedance coupling to ground is provided. Since the resistance of resistor 74 is low and transistors 71 and 72 have grounded emitters, the output impedance of the multivibrator circuit is low and can therefore directly drive disc 12.

The emitter of transistor 82 is connected in series through resistors 83 and 84 to ground. Since point "a" is directly coupled through bias resistor 81 to the base of transistor 82, transistor 82 is conducting when transistor 72 is nonconducting. Therefore, the output voltage at point "g" directly follows the voltage at point "a" or the input voltage to disc 12. It should be noted that if the output lead should become shorted to ground, transistor 82 will be protected due to the current limiting action of resistor 83.

To consider the theory of operation of the present invention, take the case of an ideal velocimeter, the output frequency $f$ of which is given by $f = C/L$ where $C$ is the velocity of propagation and $L$ is the separation between transmitter and receiver. If one uses two velocimeters sending pulses in the *opposite* directions and introduces a velocity of flow V, the two sing-around frequencies are $$f_1 = \frac{C+v}{L}$$

and $$f_2 = \frac{C-v}{L}$$

then, by taking the difference of the sing-around frequencies, we obtain the frequency $$f_v = f_1 - f_2 = 2v/L$$

which is proportional to velocity of flow. In this ideal case, variations in the speed of sound do not affect the flow measurement. There is, however, a small but finite time delay in the electronic circuitry of each velocimeter which complicates the expression for $f_v$. The individual velocity output frequencies taking the time delay $t$ into account are $$f_1 = \frac{\frac{C+v}{L}}{1+\frac{t(C+v)}{L}} = \frac{C+v}{L}1 - \frac{t(C+v)}{L} + \ldots$$

$$f_2 = \frac{\frac{C-v}{L}}{1+\frac{t(C-v)}{L}} = \frac{C-v}{L}1 - \frac{t(C-v)}{L} + \ldots$$

Typical values for the velocimeters are $(C \pm v) = 1500$ meters per second, $L = 0.15$ meter and $t = 0.6$ microsecond. The value of $t(C \pm v)/L = 0.006$ is small enough that the higher order terms in the expansions can be ignored. The expression for $f_v$ is now $$f_v = \frac{2v}{L}\left[1 - \frac{2tC}{L}\right]$$

FIGURE 4 shows in block diagram form the basic circuit requirements to obtain the velocity of sound and velocity of flow substantially independent of each other. Considering the output frequencies of oscillators 2 and 3, with the direction of flow being along the direction of the arrows, the output from oscillator 2 would be $(f - \Delta f)$ and from oscillator 3, $(f + \Delta f)$ where $\Delta f$ = frequency change due to the velocity of flow. The output signals from oscillators 2 and 3 are fed through a balanced modulator 4, for example, a balanced ring modulator, where the sum and difference frequencies are obtained. These frequencies are coupled to a filter network 6 where the frequencies $f$ and $\Delta f$ are separated and fed to any convenient counting or discriminating chart to obtain any desired information.

While the circuit theory of FIGURE 4 is sound, it is noted that when the velocity of flow is very low, $\Delta f$ will become extremely low and is difficult to measure precisely. Further, if $\Delta f$ was approximately 0, there is the possibility that the output signals from oscillators 2 and 3 ($f$) would be approximately 180° out of phase and of approximately the same amplitude. In this event, the two signals would tend to cancel each other out, resulting in a very weak output signal from which one obtains the velocity of sound. A novel solution to this problem is shown in diagram form in FIGURE 5.

In FIGURE 5 the outputs, as denoted by $(f-\Delta f)$ and $(f+\Delta f)$ from oscillators 2 and 3 respectively, are coupled to multivibrators 31 and 32 as, for example, Eccles-Jordan type, that change the asymmetrical output frequency from oscillators 2 and 3 to substantially square waves at half of the input frequency. The output from multivibrators 31 and 32, which is $$\left(\frac{f}{2}+\frac{\Delta f}{2}\right) \text{ and } \left(\frac{f}{2}-\frac{\Delta f}{2}\right)$$

respectively, is fed to balanced ring modulators 33 and 34. The output from multivibrator 31 is also fed to a bandpass filter 39 centered in the fifth harmonic of the square wave output from multivibrator 31, and in effect, produces an output frequency from multivibrator 31 which is multiplied by a factor of 5. This multiplied signal $$\left(\frac{5f}{2}+\frac{5\Delta f}{2}\right)$$

is coupled also to balanced modulators 33 and 34, which produce the sum and difference frequencies of thereto input frequencies. These sum and difference frequencies are then filtered by bandpass filter networks 35 and 36, filter 35 passing the sum frequency output $(3f+3\Delta f)$ from balanced modulator 33 and filter 36 passing the difference frequency output $(2f+3\Delta f)$ from balanced modulator 34. These frequencies are fed to balanced modulator 37 from which the sum and difference frequencies are obtained. The output signal from balanced modulator 37 is filtered by bandpass filter 38 which passes only the difference frequency $f$. The output frequency $f$ from filter 38 is proportional to the velocity of sound. The output from bandpass filter 39 is also coupled to an amplifier and Schmitt trigger circuit 41 which squares up the sinusoidal output signal therefor. The squared output from Schmitt circuit 41 is fed to a second fifth harmonic filter 43 similar to filter 39. The output frequency from multivibrator 32 is effectively multiplied by a factor of 25 in the same manner as the output from multivibrator 31 through bandpass filter 40, an amplifier and trigger circuit 42 and a second bandpass filter 44. The frequency outputs from oscillators 2 and 3, which have been effectively divided by 2 and multiplied by 25, which frequencies $$\left(\frac{25f}{2}\pm\frac{25\Delta f}{2}\right)$$

are fed to balanced ring modulator 45 which produces the sum and difference frequencies of the two input frequencies. The output from balanced modulator 45 $25f$ and $25\Delta f$ is coupled to filter 39 which passes only the difference frequency, $25\Delta f$, proportional to the velocity of flow. The main advantage in utilizing the frequency multiplier circuit is we are now able to increase the resolution from an output of the oscillators by a factor of 25 to thereby obtain a more precise frequency output.

FIGURE 6 shows an alternative use of the present invention in which a pair of transmitter transducers 90 and 91 are positioned on one side of hollow pipe 92 in which a fluid is flowing, and a pair of receiver transducers 93 and 94 are positioned on the opposite side thereof. The transducers are positioned such that transmitter transducers 90 and 91 transmit to receiver-transducers 93 and 94 such that the component of flow to be measured passes along the mean axis of the two transmission paths. In this way, one component of energy is always along the direction of flow while the other component of energy is against the direction of flow. By calculating angles $\Theta$ and $\Theta_1$ it will be easy to determine the components of frequency $\pm\Delta f$ affected by flow, and then the velocity of the flow of fluid through the hollow pipe may be obtained. An obvious advantage in a structure of this type is that no intrusions or constrictions within the pipe itself are necessary in order to determine the fluid flow.

It is to be understood that in connection with this invention that the embodiments shown are only exemplary, and that various modifications can be made in construction and arrangement within the scope of the invention as defined in the appended claims.

What is claimed is:

1. In a fluid metering device comprising a first supersonic transmitter and a first receiver located in acoustic contact with a fluid stream such that signals are transmitted through such stream from said transmitter to said receiver in a direction generally upstream of said fluid flow, a first feedback path coupling the output of said receiver to the input of said transmitter, a second supersonic transmitter and a second receiver located at such spaced points in said fluid stream that signals are transmitted through said stream to said second receiver in a direction generally downstream of said fluid flow, a second feedback path coupling the output of said second receiver to the input of said second transmitter, means in said first feedback path for deriving an output signal therefrom, means in said second feedback path for deriving a signal therefrom, the improvement being a first harmonic generating means operatively connected to said first feedback path, a second harmonic generating means operatively connected to said second feedback path, a first frequency multiplier operatively connected to said first harmonic generating means for multiplying the output signal therefrom, a second frequency multiplier operatively connected to said second harmonic generating means for multiplying the output signal therefrom, said first frequency multiplier including a bandpass filter centered in a selected harmonic frequency of the output from said first harmonic generating means and said second frequency multiplier including a bandpass filter centered in a selected harmonic frequency of the output of said second harmonic generating means and means including a balanced modulator operatively connected to the output of said first harmonic generating means and the output of said second harmonic generating means and the output of said second frequency multiplier for deriving an output signal proportional to the velocity of sound of said fluid stream.

2. The fluid meter according to claim 1 whereby each of said first and second frequency multipliers further includes a second bandpass filter centered in a selected harmonic frequency equal to the selected harmonic frequency of said first bandpass filters, said selected frequency being the fifth harmonic frequency whereby the output frequency from said second frequency multiplier is the twenty-fifth harmonic of the output frequency from said first and second feedback paths, respectively.

3. The fluid meter according to claim 2 further including means including a second balance modulator operatively connected to the outputs from each of said second bandpass filters deriving an output signal proportional to the velocity of flow of said fluid stream.

References Cited by the Examiner
UNITED STATES PATENTS

| 2,451,822 | 10/1948 | Guanella | 343—12 |
| 2,480,646 | 8/1949 | Grabau | 340—3 X |
| 2,515,472 | 7/1950 | Rich | 324—68 X |
| 2,669,121 | 2/1954 | Garman et al. | 73—194 |
| 2,841,775 | 7/1958 | Saunders | 340—3 |

WALTER L. CARLSON, *Primary Examiner.*

C. A. S. HAMRICK, M. J. LYNCH, *Assistant Examiners.*